United States Patent
Tan et al.

(10) Patent No.: US 7,862,105 B2
(45) Date of Patent: Jan. 4, 2011

(54) MOTOR COMPARTMENT RAIL ASSEMBLY WITH STABILITY ENHANCEMENT MEMBER

(75) Inventors: Soo A. Tan, Shelby Township, MI (US); Bradley E. Bowers, Holly, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 49 days.

(21) Appl. No.: 12/389,444

(22) Filed: Feb. 20, 2009

(65) Prior Publication Data

US 2010/0213725 A1    Aug. 26, 2010

(51) Int. Cl.
    *B60N 99/00* (2006.01)
(52) U.S. Cl. .............. 296/187.13; 296/193.05; 296/203.03
(58) Field of Classification Search .............. 293/132, 293/133, 154, 155; 296/187.09, 193.09, 296/203.02, 187.13, 193.05, 203.03
    See application file for complete search history.

(56) References Cited

U.S. PATENT DOCUMENTS

| | | | |
|---|---|---|---|
| 5,868,457 A | 2/1999 | Kitagawa | |
| 6,354,654 B2 | 3/2002 | Lee | |
| 6,808,039 B2 | 10/2004 | Roehringer et al. | |
| 7,066,509 B2 | 6/2006 | Kollaritsch et al. | |
| 7,185,945 B2 * | 3/2007 | Dandekar et al. | 296/187.09 |
| 7,270,368 B2 | 9/2007 | Aonuma et al. | |

FOREIGN PATENT DOCUMENTS

| | | |
|---|---|---|
| DE | 3826958 | 3/1989 |
| EP | 1184263 | 3/2002 |
| JP | 2002012164 | 1/2002 |

* cited by examiner

*Primary Examiner*—Lori L Lyjak
(74) *Attorney, Agent, or Firm*—Quinn Law Group, PLLC

(57) ABSTRACT

A rail assembly for a motor compartment of a motor vehicle having a bumper and a deformable energy-absorbing device secured rearward of the bumper, includes a longitudinally-extending motor compartment rail operatively connected rearward of the energy absorbing device and having an inner rail member and an outer rail member configured to define a cavity therebetween. A stability enhancement member transversely spans the cavity and is secured to both the inner rail member and the outer rail member.

13 Claims, 3 Drawing Sheets

MOTOR COMPARTMENT RAIL ASSEMBLY WITH STABILITY ENHANCEMENT MEMBER

TECHNICAL FIELD

The invention relates to a motor compartment rail assembly for a motor vehicle.

BACKGROUND OF THE INVENTION

The motor compartment of a vehicle is often configured with an energy absorbing device, sometimes referred to as a crush box, located between a bumper and a longitudinally-extending motor compartment rail. The crush box is configured to deform in the event of an impact force on the bumper, to minimize deformation and energy transfer rearward to the motor compartment rail. Depending on the magnitude of the impact energy, the motor compartment rail may also deform. It is desirable to control the deformation in an axial (fore-aft) direction. Thin-walled motor compartment rails that have a "tall aspect ratio", i.e., a relatively large height to transverse width ratio, are more susceptible to deformation in other than a fore-aft direction than thicker walled rails or rails with a lower aspect ratio. Adding wall thickness is one solution, but this adds weight to the vehicle, increases the rail cross-section size, and affects packaging.

SUMMARY OF THE INVENTION

A motor compartment rail assembly is provided that enhances stability of a motor compartment rail, and is especially useful in stabilizing relatively thin-walled, tall aspect ratio rails to prevent deformation in which the rail pivots laterally inward or outward (i.e., "Z-moment" deformation) without adding significant weight.

Specifically, a rail assembly for a motor compartment of a motor vehicle having a bumper and a deformable energy-absorbing device secured rearward of the bumper, includes a longitudinally-extending motor compartment rail operatively connected rearward of the energy absorbing device and having an inner rail member and an outer rail member configured to define a cavity therebetween. A stability enhancement member transversely spans the cavity and is secured to both the inner rail member and the outer rail member. Preferably, the stability enhancement member is secured to inner surfaces of the inner and outer rail members generally perpendicular to the inner surfaces. The stability enhancement member may be configured with corrugations extending at least partway between the inner and outer rail members. The stability enhancement member may be positioned immediately rearward of a joint that establishes an interface between the energy absorbing device and the rail member, or may be positioned further rearward of the joint, such as between the joint and a cradle mount joint further rearward of the interface joint.

Accordingly, a method of assembling a motor compartment rail having an inner rail member and an outer rail member as described above includes securing a stability enhancement member to both the inner rail member and the outer rail member to transversely span a cavity defined therebetween.

The securing of the stability enhancement member may be by welding the stability enhancement member to an inner surface of one of the inner and outer rail members, and, after the welding, securing the inner rail member to the outer rail member to enclose the stability enhancement member within a cavity formed therebetween. The stability enhancement member is then welded to the other of the inner and outer rail members from outside of the cavity. Apertures may be formed in the rail aligned with the stability enhancement member to ensure that the welding occurring after the stability enhancement member is enclosed between the rail members is directed to the stability enhancement member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
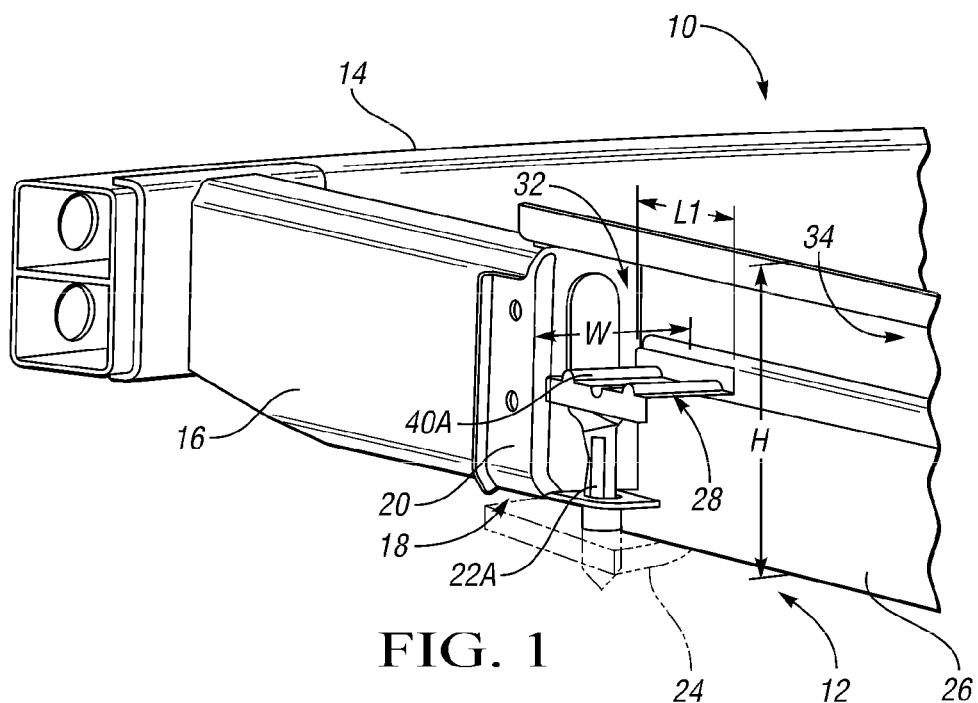
FIG. 1 is a schematic perspective fragmentary illustration of a motor compartment of a motor vehicle having a first embodiment of a rail assembly with a stability enhancement member.

Referring to the drawings, wherein like reference numbers refer to like components throughout the several views, FIG. 1 shows a portion of a motor compartment 10 of a motor vehicle including a first embodiment of a rail assembly 12. The motor compartment 10 is partly defined by a front bumper 14, shown in part as a bumper beam. An energy-absorbing device 16, referred to as a crush box herein, is secured to the bumper 14 rearward thereof. The crush box 16 is secured to the rail assembly 12 via a joint interface 18 that includes a crush box attachment portion 20 and a cradle mount joint 22A. The crush box attachment portion 20 is bolted or otherwise secured to the crush box 16. The cradle mount joint 22A is secured through an opening in an outer rail member 30, shown in FIGS. 2 and 3, into aperture of an engine cradle 24, shown partially in phantom.

Figure 2:
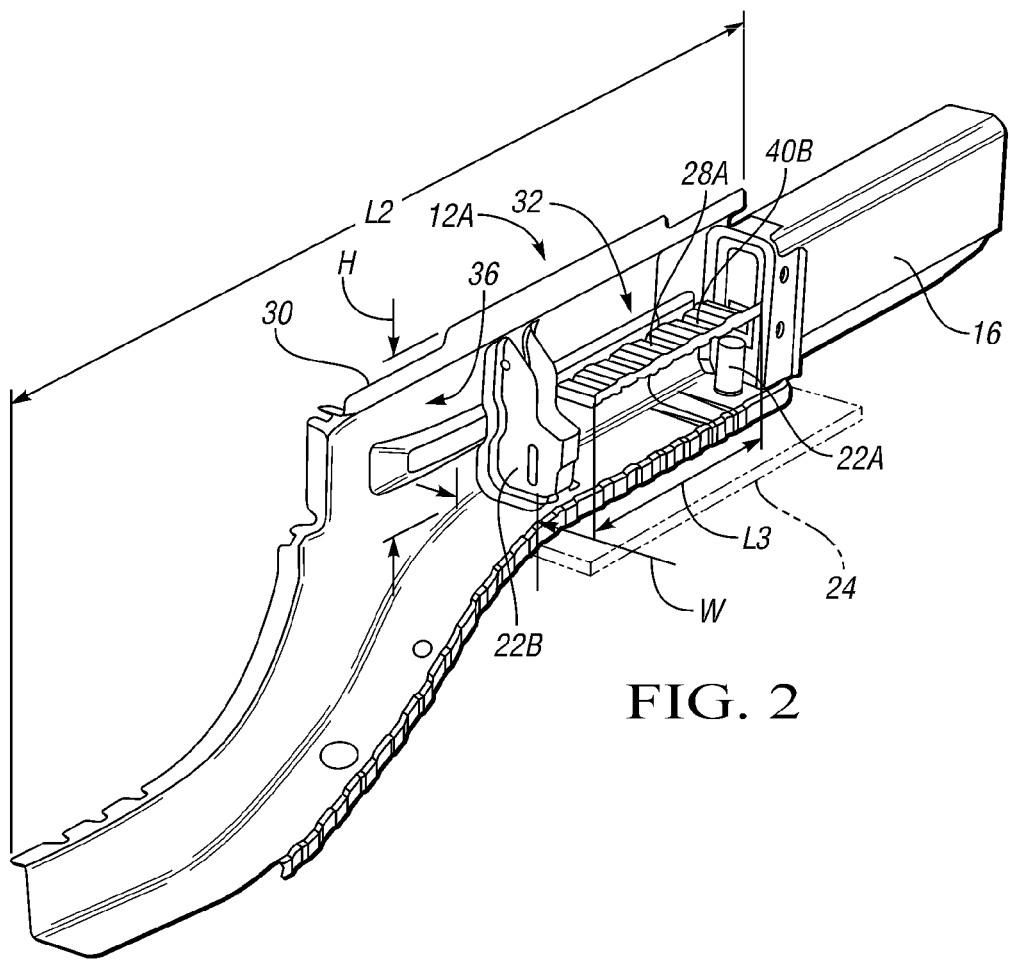
FIG. 2 is a schematic perspective illustration of a portion of the motor compartment of FIG. 1 with a second embodiment of a rail assembly having an alternative stability enhancement member.

The rail assembly 12 includes an inner rail member 26 extending longitudinally rearward from the joint interface 18. The rail assembly 12 also includes an outer rail member 30, which is removed in FIG. 1 to reveal a stability enhancement member 28. The outer rail member 30 is shown in FIG. 2 as part of an alternative rail assembly 12A alike in all aspects to rail assembly 12 except having a longer stability enhancement member 28A. The inner rail member 26 and the outer rail member 30 run in a longitudinal direction, substantially parallel to one another and are joined to one another by bolts, welding or the like, or may simply abut or overlap one another and be joined only to the interface joint 18 and supported on the engine cradle 24 at the cradle mount joint 22A and at another cradle mount joint 22B shown in FIG. 2.

As shown in FIG. 2, the cradle mount joints 22A, 22B are supported at openings in the outer rail member 30 on the engine cradle 24. The inner rail member 26 and the outer rail member 30 define a substantially closed cavity 32 therebetween. Referring to FIG. 1, the stability enhancement member 28 transversely spans the cavity 32 and is welded substantially perpendicular to inner surfaces 34, 36 of the inner rail member 26 and the outer rail member 30, respectively. It should be appreciated that the stability enhancement member 28 need not be substantially perpendicular to the inner surfaces 34, 36 of rail members 26, 30, and in alternative embodiments may span the cavity 32 therebetween at any angle to the surfaces 34, 36.

The rail assemblies 12 and 12A are each "tall aspect ratio" rail assemblies as the height H of the inner rail member 26 and the outer rail member 30 is at least twice the width W of the assembled inner and outer rail members 26, 30. Such tall aspect ratio rail assemblies have a tendency to deform by pivoting about a vertical axis, i.e., creating what is referred to by those skilled in the art as a "Z moment".

Each of the stability enhancement members 28, 28A are secured approximately midway along the height H of the rail members 26, 30 and absorb energy, acting to increase Z-moment force capacity and delay such Z moment deformation, making the rail members 26, 30 more apt to deform in a fore/aft direction, which is preferable.

As shown in FIG. 1, the stability enhancement member 28 is formed with transverse corrugations 40A, also referred to as ribs. Stability enhancement member 28A of FIG. 2 also has corrugations 40B. The corrugations 40A, 40B help to strengthen the respective stability enhancement member 28, 28A, and further tune the energy-absorbing device 16 to attain a desired force capacity and deformation mode.

In FIG. 1, the stability enhancement member 28 is secured to the rail members 26, 30 immediately rearward of the joint interface 18. It should be appreciated that the stability enhancement member 28 may alternatively be placed further rearward along rail members 26, 30. Additionally, more than one stability enhancement member may be utilized. In FIG. 1, the stability enhancement member 28 has a relatively short length L1 in relation to a fore/aft length L2 of the rail members 26, 30 (length L2 indicated in FIG. 2, but being representative of the length of the inner rail member 26 of FIGS. 1 and 4 as well). In FIG. 2, the stability enhancement member 28A has a longer length L3, which is still less than the length L2 of the rail members 26, 30. Testing may be performed to determine the optimal length of a stability enhancement member 28, 28A to provide sufficient stability to the rail assembly 12, 12A while minimizing added mass.

Figure 3:
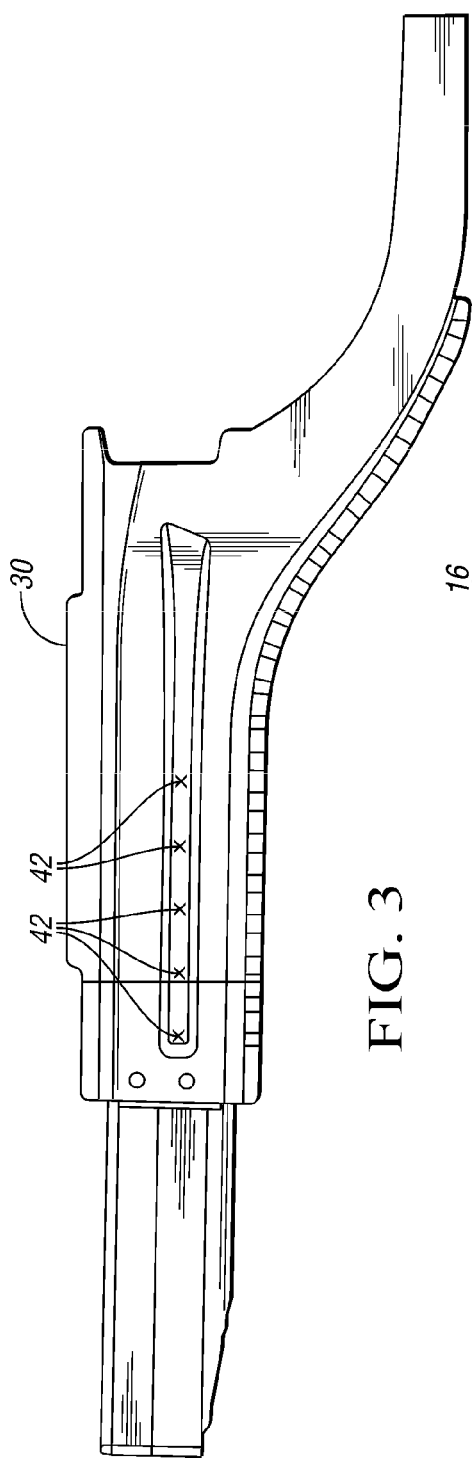
FIG. 3 is a schematic side view illustration of the rail assembly of FIG. 2 showing weld points where the stability enhancement member is welded to the outer rail member.
Figure 4:
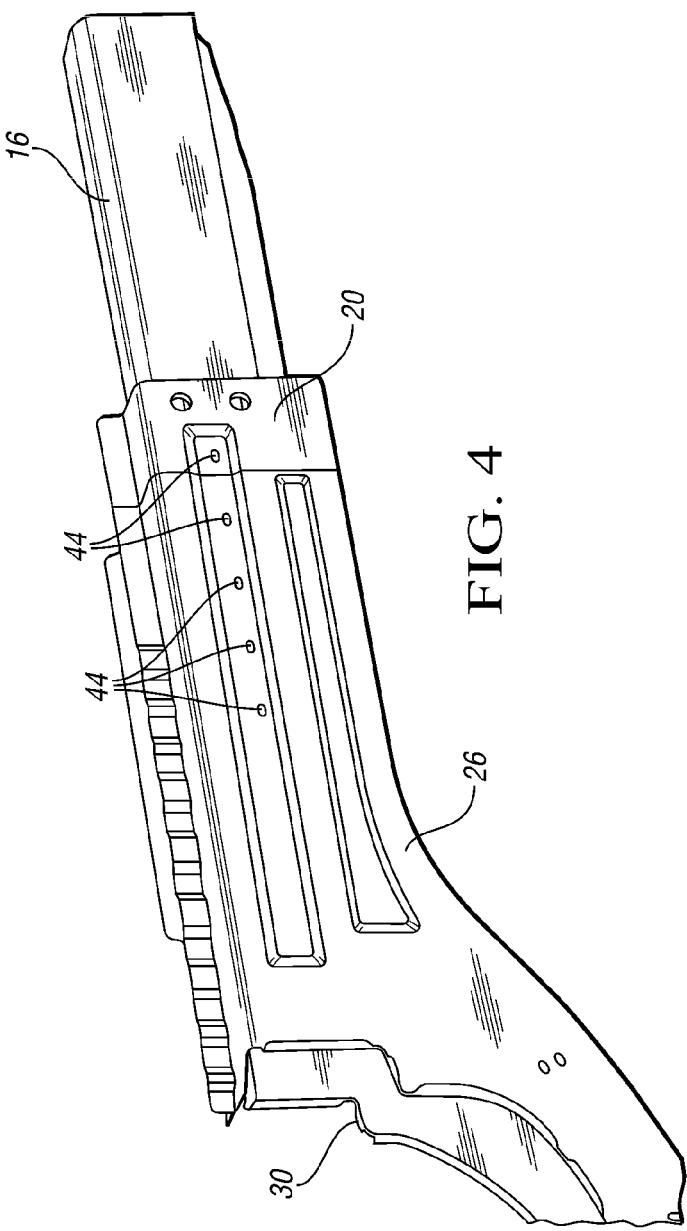
FIG. 4 is a schematic side view illustration of the rail assembly of FIG. 2 showing apertures in the inner rail member where the stability enhancement member is welded to the inner rail member.
Figure 5:
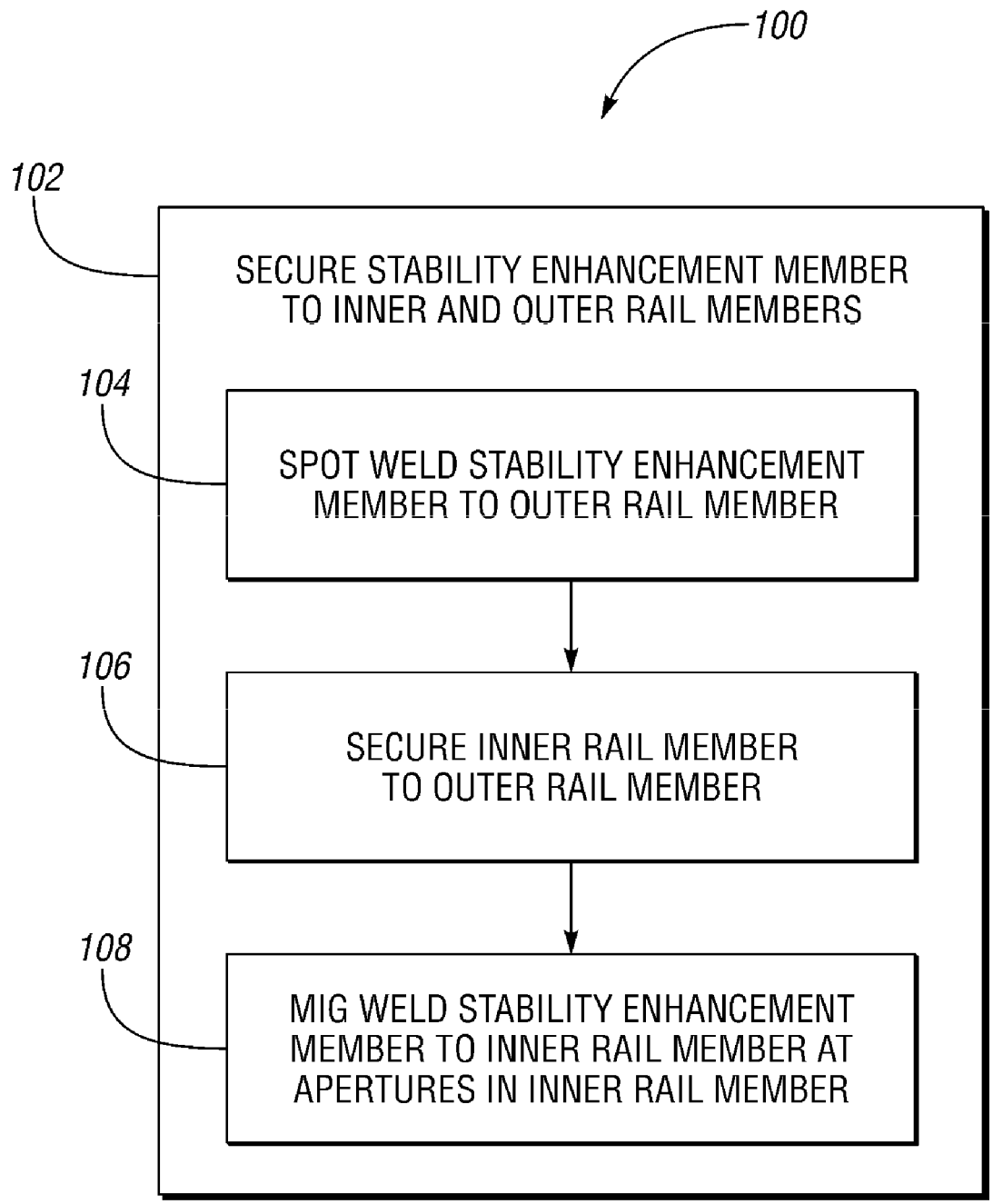
FIG. 5 is a flow diagram illustrating a method of assembling a motor compartment rail.

A method 100 of assembling the rail assembly 12 of FIG. 1 or rail assembly 12A of FIGS. 2-4 is described with respect to the flow diagram of FIG. 5. The method 100 includes step 102, in which the stability enhancement member 28 or 28A is secured to the inner and outer rail members 26, 30. Step 102 includes sub steps 104, 106 and 108. In sub step 104, the stability enhancement member 28 or 28A is spot welded to the outer rail member 30, preferably so that the stability enhancement member 28 or 28A extends substantially perpendicularly to the inner surface 36 of the outer rail member 30, and therefore extends in a generally transverse direction with respect to the vehicle. Weld points 42 indicated in FIG. 3 illustrate the spot welding of the outer rail member 30 to the stability enhancement member 28 or 28A. Any additional stability enhancement members are also spot welded to the outer rail member 30 at this time. The stability enhancement member 28 or 28A may alternatively be secured to the outer rail member 30 in another manner, such as by bolts or other fasteners. The cradle mount joints 22A, 22B may then be placed in position through the openings in the outer rail member 30. The crush box 16 may have previously been secured to the interface joint 18, or may be later secured thereto after rail assembly 12 or 12A is completely assembled.

After step 104, the method 100 proceeds to step 106, in which the inner rail member 26 is secured to the outer rail member 30. This substantially encloses the stability enhancement member 28 or 28A within the cavity 32 defined by the inner and outer rail members 26, 30. As described above, the rail members 26, 30 may be bolted or welded to one another, or may simply abut one another and be secured to nearby components, such as the interface joint 18 or the engine cradle 24.

After step 106, the stability enhancement member 28 or 28A can now be secured to the inner rail member 26 by MIG welding the components to one another from outside of the cavity 32 (i.e. from outside of the rail members 26, 30) through apertures 44 (shown in FIG. 4) formed in the inner rail member 26 to align with the stability enhancement member 28 or 28A.

While the best modes for carrying out the invention have been described in detail, those familiar with the art to which this invention relates will recognize various alternative designs and embodiments for practicing the invention within the scope of the appended claims.

The invention claimed is:

1. A rail assembly for a motor compartment of a motor vehicle having a bumper and a deformable energy-absorbing device secured rearward of the bumper, comprising:
  a longitudinally-extending motor compartment rail operatively connected rearward of the energy absorbing device and having an inner rail member and an outer rail member configured to define a cavity therebetween; wherein at least one of the inner rail member and the outer rail member is characterized by a height; and
  a stability enhancement member transversely spanning the cavity generally midway along the height of the at least one of the inner rail member and the outer rail member and secured to both the inner rail member and the outer rail member.

2. The rail assembly of claim 1, wherein the inner and outer rail members have inner surfaces facing one another and the stability enhancement member is secured to the inner surfaces generally perpendicular to the inner surfaces.

3. The rail assembly of claim 1, wherein the height of the inner and outer rail members is at least twice as great as a width of the assembled rail members.

4. The rail assembly of claim 1, wherein the stability enhancement member is characterized by a length less than a length of the inner and outer rail members.

5. The rail assembly of claim 1, wherein the stability enhancement member is configured with corrugations extending transversely at least partway between the inner and outer rail members.

6. The rail assembly of claim 1, wherein the motor vehicle includes a joint establishing an interface between the energy absorbing device, the rail and an engine cradle, and wherein the stability enhancement member is positioned immediately rearward of the joint.

7. The rail assembly of claim 1, wherein the inner rail has apertures positioned to align with the stability enhancement member.

8. A motor vehicle comprising:
  a bumper;
  an energy absorbing device extending rearward of the bumper;
  an interface joint;
  a motor compartment rail extending longitudinally, operatively connected with the energy absorbing device by the interface joint, and having an inner rail member and an outer rail member configured to define a closed cavity therebetween; and a stability enhancement member transversely spanning the cavity and secured to both the inner rail member and the outer rail member.

9. The motor vehicle of claim 8, wherein the stability enhancement member is immediately rearward of and in contact with the interface joint.

10. The motor vehicle of claim 8, further comprising:

an engine cradle; wherein the interface joint is mounted to the engine cradle to establish a first cradle mount joint;

a second cradle mount joint rearward of the interface joint and configured to mount the motor compartment rail to the engine cradle; and wherein the stability enhancement member is positioned between the first and second cradle mount joints.

11. A method of assembling a motor compartment rail having an inner rail member and an outer rail member, comprising:

securing a stability enhancement member to both the inner rail member and the outer rail member to transversely span a cavity defined therebetween.

12. The method of claim 11, wherein the securing comprises:

welding the stability enhancement members to an inner surface of one of the inner and outer rail members;

securing the inner rail member to the outer rail member to enclose the stability enhancement member within a cavity formed therebetween; and welding the stability enhancement member to the other of the inner and outer rail members from outside of the cavity.

13. The method of claim 12, wherein said welding the stability enhancement member to the other of the inner and the outer rail members is through apertures in the other of the inner and the outer rail members; wherein the apertures are aligned with the stability enhancement member.

* * * * *